United States Patent Office 3,218,332
Patented Nov. 16, 1965

3,218,332
2-PHENYL-BENZTRIAZOLE COMPOUNDS
Hansjörg Heller, Riehen, near Basel, Jean Rody, Basel, and Ernst Keller, Binningen, near Basel, Switzerland, assignors to J. R. Geigy A.-G., Basel, Switzerland
No Drawing. Filed June 15, 1962, Ser. No. 202,696
Claims priority, application Switzerland,
June 16, 1961, 7,102/61
6 Claims. (Cl. 260—308)

The present invention concerns new substituted 2-phenyl-benztriazole compounds, processes for the production thereof, their use for the protection of light-sensitive organic materials, i.e. high polymeric materials, their use for the production of UV filters and, as industrial product, the organic material protected from the injurious influence of light with the aid of these compounds.

It has been found that valuable substituted 2-phenyl-benztriazole compounds are obtained by reacting a 2-(2'-hydroxyphenyl)-benztriazole compound having the 3'-position free, the benzene rings of which can contain in the 4-, 5-, 6-, 4'- and 5'-positions substituents, with a $\Delta^2$-alkenyl halide possibly substituted by alkyl, aralkyl or aryl radicals, to form a corresponding 2-(2'-alkenyloxyphenyl)-benztriazole and rearranging this by methods known per se to form a corresponding 2-(2'-hydroxy-3'-propenylphenyl)-benztriazole.

The new 2-phenyl-benztriazole compounds are produced according to the following scheme of reactions:

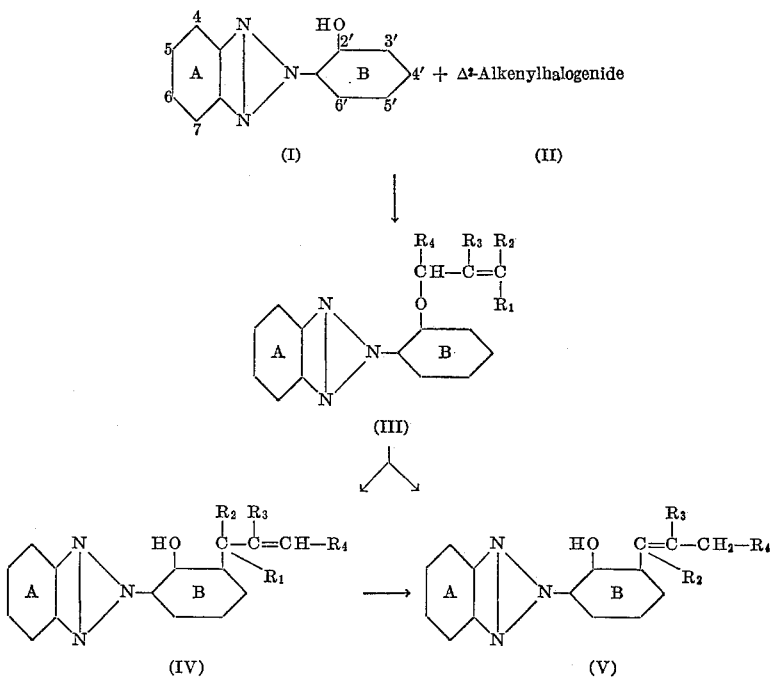

In these Formulae II, III, IV and V, each of $R_1$, $R_2$, $R_3$ and $R_4$ represents hydrogen, halogen, or an alkyl, aralkyl or aryl radical; the benzene nuclei A and B in the Formulae I, III, IV and V can contain substituents in the 4-, 5-, 6-, 4'- and 5'-positions.

The benzene ring A can contain, in the 4-, 5- and 6-positions, for example, alkyl groups such as methyl, ethyl, n-propyl, isopropyl, n-, iso-, tert.-butyl groups; alkoxy groups such as methoxy or butoxy groups; halogens such as chlorine or bromine, carboxyl groups, carboxylic acid ester groups, i.e. carboxylic acid alkylester groups such as carbomethoxy, carboethoxy, carbopropoxy or carbobutoxy groups; sulphonic acid ester groups, particularly sulphonic acid arylester groups such as sulphonic acid phenylester and cresylester groups; carboxylic acid or sulphonic acid amide groups possibly substituted at the nitrogen atom aliphatically, cycloaliphatically, araliphatically or aromatically such as carboxylic or sulphonic acid amide, methylamide, ethylamide, cyclohexylamide, benzylamide, phenylamide, dimethylamide, diethylamide, piperidide or morpholide groups, as well as alkylsulphonyl groups such as methylsulphonyl or ethylsulphonyl groups. The benzene ring B can be substituted in the 4'- and 5'-positions by hydrocarbon groups such as methyl, ethyl, butyl, benzyl, cyclohexyl, or phenyl groups; alkoxy groups such as methoxy, ethoxy, propoxy, isopropoxy or n-butoxy groups; or halogens such as chlorine or bromine.

$R_1$ is preferably hydrogen or a low alkyl radical such as the methyl group. $R_2$ is preferably hydrogen, an alkyl group with 1–5 carbon atoms, an aralkyl radical such as the benzyl radical, an aryl radical such as the phenyl radical. $R_3$ is preferably hydrogen, a low alkyl radical such as the methyl group, or halogen such as chlorine. $R_4$ is preferably an alkyl group having 1–5 carbon atoms, particularly however, it is hydrogen.

Benztriazole compounds which absorb particularly at long wave lengths are obtained if there are acidifying substituents in the ring A and/or basifying substituents in the 5'-position. Benztriazole compounds having particularly high molar extinction in the region of 330–350 mµ are obtained if there are basifying substituents in the 5- and/or 4'-position.

Examples of basifying substituents are alkoxy groups such as the methoxy, isopropoxy, cyclohexyloxy or benzyloxy group; examples of acidifying substituents are alkylsulphonyl groups such as the methyl and ethyl sulphonyl group, sulphonic acid amide groups such as the sulphonic acid methylamide, butylamide or cyclohexylamide group, and also the carboxyl group and its esters or amides.

The condensation of the 2-(2'-hydroxyphenyl)-benztriazole compound of Formula I with the $\Delta^2$-alkenyl halide II to form the 2-(2'-alkenyloxyphenyl)-benztriazole compound of Formula III is performed advantageously by heating, possibly in the presence of an acid buffering agent such as an alkali or alkaline earth hydroxide or an alkali carbonate or a fatty acid alkali metal salt such as sodium acetate. Advantageously bromoallyl or iodoallyl compounds are used as $\Delta^2$-alkenyl halides; if catalytic amounts of inorganic iodides are used, e.g. sodium, potassium or calcium iodide, the reaction also occurs with allyl chlorides.

A 2-(2'-alkenyloxphenyl)-benztriazole of Formula III is rearranged into the correspondence $\Delta^2$-propenyl compound of Formula IV by methods known per se, for example, by heating compounds of Formula III at 180–220° C. either alone (in which case an exothermic reaction often occurs) or by refluxing in an inert solvent e.g. in dimethylaniline (so-called Claisen rearrangement, see J. E. Gowan and T. S. Whyler, Name Index of Organic Reactions (1960), No. 156; Claisen Rearrangements of Allyl Ethers). As it has now been found, this rearrangement can also be brought about by heating in polymers. Thus it is possible to make the rearrangement in the substratum to be protected itself during polymerization such as, e.g. during the polycondensation of nylon, or while processing such as extruding or molding of polyolefines.

The Claisen rearrangement can also be attained by the application of other energies than thermic. In many cases irradiation with UV light is sufficient to cause the desired rearrangement.

For these two reasons it is possible in certain cases to use the more easily accessible and cheaper allyl ethers instead of the 2-(2'-hydroxy - 3' - propenylphenyl)-benztriazoles although they are much less active light protecting agents.

If in Formulae III, IV and V, at least one of $R_1$ and $R_2$ is hydrogen and the rearrangement of the 2-(2'-alkenyloxyphenyl)-benztriazole compounds of Formula III is preformed by heating in the presence of strong bases, e.g. in the presence of alkali, tetraalkylammonium or alkaline earth hydroxides, alcoholates or phenolates, then $\Delta^1$-propenyl compounds of Formula V are obtained.

Naturally, the $\Delta^1$-propenyl compounds of Formula V can also be formed from the $\Delta^2$-propenyl compounds of Formula IV by heating the latter in strong bases provided that in these $\Delta^2$-propenyl compounds at least one of $R_1$ and $R_2$ is hydrogen.

It is also possible to perform the reaction of the two starting materials I and II at such high temperatures that the 2-(2'-alkenyloxyphenyl)-benztriazole compounds of Formula III formed are rearranged spontaneously into the 2-(2'-hydroxy-3'-propenylphenyl)-benztriazole compounds of Formula IV or V.

A modification of the process for the production of 2-(2'-hydroxy - 3' - propenylphenyl) - benztriazole compounds of Formula IV or V consists in respectively oxidising a 2-amino - 2' - propenyloxy - 1,1' - azobenzene compound or reducing a 2 - nitro-2'-propenyloxy - 1,1'-azobenzene compound, both of which have a free 3'-position, the propylene radicals of which can be further substituted by halogen alkyl, aralkyl or aryl groups and the benzene nuclei of which can contain further substituents in the 4-, 5-, 6-, 4'- and 5'-positions, into the corresponding 2-(2'-propenyloxyphenyl)-benztriazole compound and rearranging this into corresponding 2-(2'-hydroxy-3'-propenylphenyl)-benztriazole compound.

Such 2 - amino - 2' - propenyloxy-1,1'-azobenzene compounds are obtained, e.g. by coupling diazotised o-propenyloxyanilines (obtained by reduction of the corresponding nitro compounds according to Béchamp) with anilines coupling in the o-position to the amino group.

2-nitro-2'-propenyloxy-1,1'-azobenzene compounds are obtained, e.g. by propenylation of the corresponding 2-nitro-2'-hydroxy-1,1'-azobenzene compounds.

Both the oxidative and reductive ring closures are performed by known methods; the former, e.g. with copper-(II) salts in alkaline medium, the latter, e.g. with zinc dust in alkaline medium. The rearrangement of the 2'-propenyloxy compound into the 2'-hydroxy-3'-propenyl compound is performed as described above.

A further modification of the process for the production of 2-(2'-hydroxy - 3' - propenylphenyl)-benztriazole compounds of Formula IV or V consists in oxidising a 2-amino-2'-hydroxy-3'-propenyl - 1,1' - azobenzene compound, the propenyl radical of which is possibly further substituted by halogen alkyl, aralkyl or aryl groups and the benzene nuclei of which can contain substituents in the 4-, 5-, 6-, 4'- and 5'-positions, to form the corresponding 2-(2'-hydroxy - 3' - propenylphenyl) - benztriazole compound.

Such o-aminoazobenzene compounds are obtained, e.g. by coupling diazotised 2-tosyloxy-3-propenyl anilines with anilines coupling in the o-position to the amino group and saponifying the tosyloxy group to the hydroxyl group.

The oxidative ring closure is performed as described above.

Another possibility for producing 2-(2'-hydroxy-3'-propenylphenyl)-benztriazole compounds of Formula IV or V consists in reducing a 2-nitro-2'-hydroxy-3'-propenyl-1,1'-azobenzene compound, the propenyl radical of which can possibly be further substituted by halogen alkyl, aralkyl or aryl groups and the benzene nuclei of which can contain in the 4-, 5-, 6-, 4'- and 5'-positions, to form the corresponding 2-(2'-hydroxy-3'-propenylphenyl)-benztriazole compound.

Such o-nitroazobenzene compounds are obtained, e.g. by coupling an o-nitrobenzene diazonium compound with a 2-propenylphenol coupling in the 6-position.

The reductive ring closure is performed as described above.

Another modification of the process for the production of 2-(2'-hydroxy-3'-propenylphenyl)-benztriazole compounds of Formula IV or V consists in saponifying the acyloxy group in a 2-(2'-acyloxy-3'-propenylphenyl)-benztriazole compound, in which the propenyl radical can possibly be further substituted by halogen, alkyl, aralkyl or aryl groups and the benzene nuclei can contain substituents in the 4-, 5-, 6-, 4'- and 5'-positions.

Such triazole compounds are obtained, e.g. by oxidative ring closure of the corresponding 2-amino-2'-acyloxy-1,1'-azobenzene compound or by reductive ring closure of the corresponding 2-nitro-2'-acyloxy-1,1'-azobenzene compound.

The saponification of the acyloxy group is performed by known methods in aqueous medium with agents having an alkaline reaction.

Depending on the way in which they are substituted, the new substituted 2-phenyl-benztriazole compounds of the Formulae III, IV and V are colourless to pale yellowish coloured and they absorb UV light.

Those compounds which absorb the greatest amount of UV light possible are particularly valuable as then only slight concentrations are sufficient to attain an adequate filter action.

Compared with the previously known 2-(2'-hydroxyphenyl)-benztriazole compounds used as starting materials, the compounds of Formulae IV and V have improved fastness to sublimation, improved absorption and also less sensitivity to metal. They are incorporated into the light sensitive carriers in slight amounts of 0.001–5%, in particular in amounts of 0.01–1% of the carrier.

Carriers for the new compounds of Formulae III, IV and V and also rearrangement medium for the compounds of Formula III are principally polymers, chiefly completely synthetic polymers, e.g. addition polymers, in particular polyethylene, polypropylene, polyacryl compounds, in particular polymethylmethacrylate or polyacrylonitrile, also condensation polymers such as polyesters, e.g. polyethylene glycol terephthalates, or polyamides, e.g. polycaprolactam, or also mixed polymers such as, e.g. polyester resins; also natural polymers or synthetic modifications thereof such as, e.g. cellulose, cellulose esters and ethers, and proteins.

The molecular weight of the polymers mentioned above plays a subordinate part as long as it is between the margins necessary for the characteristic mechanical properties of the polymers concerned. Depending on the polymers, it can be between 1000 and several millions.

The new substituted 2-phenylbenztriazole compounds are incorporated into these polymers—depending on the type of polymer—e.g. by working in at least one of these compounds and possibly other additives such as, e.g. plasticisers, antioxidants, heat stabilisers and pigments, into the melts by the methods usual in the industry before or during moulding or by dissolving the polymers and the additives in solvents and subsequent evaporating off the latter. The new substituted 2-phenyl-benztriazole compounds can also be drawn onto films or threads from baths, e.g. from aqueous dispersions.

The light sensitive materials can also be protected from the injurious effect of light by painting them with a protective coating containing at least one compound of Formula I, e.g. a lacquer, or by covering them with covers—preferably film-like—which contain such stabilisers. In both these cases the amount of stabiliser added is advantageously 10–30% (calculated on the protective coating material) for protective coatings of less than 0.01 mm. thickness and 1–10% for protective coatings of from 0.01–0.1 mm. thickness.

In non-polar polymers, those benztriazole compounds are particularly suitable which themselves contain as few polar groups as possible such as carboxylic or sulphonic acid amide grouping, particularly those of primary amides. In this case, generally products having a low melting point are preferred because of their solubility.

For certain applications, particularly when warm chips have to be powdered, products which melt at above the fusion temperature of the polymers concerned and, in spite of this, are sufficiently soluble in the melted polymers, are particularly valuable.

Particularly valuable compounds correspond to the formula

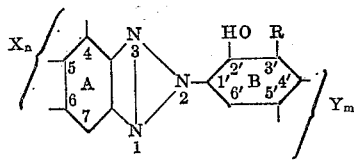

wherein

R is the group

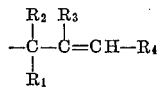

or the group

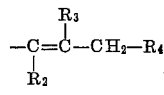

and in which
$R_1$ is preferably hydrogen, but it can also be lower alkyl, especially methyl,
$R_2$ is hydrogen, lower alkyl, e.g. methyl or amyl, mononuclear aralkyl, especially benzyl, or mononuclear aryl, especially phenyl,
$R_3$ is hydrogen, lower alkyl, especially methyl or halogen, especially chlorine, and
$R_4$ is preferably hydrogen, but it can also be lower alkyl, e.g. methyl or amyl,
$n$ is a member from 0 to 3 inclusive, and
$m$ is a member from 0 to 2 inclusive.

The substituent X in the benzene nucleus A can be independently in the positions 4, 5 or 6 and represents, lower alkyl, e.g. methyl, lower alkoxy, e.g. methoxy or butoxy, carboxyl, lower carbalkoxy, e.g. carbomethoxy or carbobutoxy, carbonic acid amide, especially carbo dialkylamide or carbo cyclohexylamide, lower alkyl sulfonyl, e.g. methyl sulfonyl or ethyl sulfonyl, sulfonamide, especially sulfon-loweralkylamide or sulfon-monoloweralkylamide, sulfonyl mononuclear arylester, especially sufonyl phenyl ester, and halogen, especially chlorine or bromine. Of course, when $n$ is zero, hydrogen is bonded at the 4, 5 and 6 positions. When $n$ is 1, two of the three substituents at the 4, 5 and 6 positions are hydrogen. When $n$ is 2, one of said substituents is hydrogen and when $n$ is 3, none of said substituents are hydrogen. In the positions 4 and/or 6 of the benzene nucleus A the substituent is preferably hydrogen, but it can also be methyl or chlorine.

The substituent Y in benzene nucleus B can be independently in the positions 4' and 5' and represents lower alkyl, e.g. methyl or butyl, lower alkoxy, e.g. methoxy or butoxy, cycloalkyl, especially cyclopentyl or cyclohexyl, mononuclear aralkyl, especially benzyl or phenethyl, mononuclear aryl, especially phenyl, and halogen, especially chlorine or bromine. Of course when $m$ is zero both of said substituents of the 4' and 5' positions are hydrogen. When $m$ is 1 or 2, a similar relationship as with X exists. In the 4' position Y is preferably hydrogen, but it can also be methyl. When used in the above, "lower" is intended to encompass a radical embracing to 5 carbon atoms. Advantageously the benzene nucleus A is substituted in the position 5 and the benzene nucleus B in the position 5'. The 2' position in benzene ring B must always carry a hydroxy while the 3' position in benzene ring B must always carry said R moiety. In both the positions 7 of the benzene nucleus A and 6' of the benzene nucleus B there is always hydrogen.

The following examples illustrate the invention. Where not otherwise stated, the parts are given as parts by weight. The temperatures are in degrees centigrade. The relationship of parts by weight to parts by volume is as that of kilogrammes to litres.

*Example 1*

26.5 parts of 2-(2'-allyloxy-5'-methylphenyl-benztriazole are heated for 1 hour at 200–220° in an atmosphere of nitrogen. After cooling, the reaction product is crystallised from methanol. 23 parts of 2-(2'-hydroxy-3'-allyl-5'-methylphenyl)-benztriazole are obtained. M.P. 100°.

In an analogous manner, 2-(2'-hydroxy-3'-allyl-5'-methylphenyl)-5-chlorobenztriazole,
2-(2'-hydroxy-3'-allyl-5'-methylphenyl)-5-carboxybenztriazole,
2-(2'-hydroxy-3'-allyl-5'-methylphenyl)-5-ethylsulfonyl benztriazole,
2-(2'-hydroxy-3'-allyl-4',5'-dimethylphenyl)-5-bromobenztriazole,
2-(2'-hydroxy-3'-allyl-5'-methylphenyl)-benztriazole-5-carboxylic acid-cyclohexylamide,
2-(2'-hydroxy-3'-allyl-5'-methylphenyl)-benztriazole-5-carboxylic acid-diethylamide,
2-(2'-hydroxy-3'-allyl-5'-methylphenyl)-5-diethylamidosulfonylbenztriazole, are obtained by thermic rearrangement under the conditions described above from 2-(2'-allyloxy-5'-methylphenyl)-5-chlorobenztriazole,
2-(2'-allyloxy-5'-methylphenyl)-5-carboxybenztriazole,
2-(2'-allyloxy-5'-methylphenyl)-5-ethylsulfonylbenztriazole,
2-(2'-allyloxy-4',5'-dimethylphenyl)-5-bromobenztriazole,
2-(2'-allyloxy-5'-methylphenyl)-benztriazole-5-carboxylic acid cyclohexylamide, 2-(2'-allyloxy-5'-methylphenyl)-benztriazole-5-carboxylic acid diethylamide,
2-(2'-allyloxy-5'-methylphenyl)-5-diethylamidosulfonylbenztriazole.

The 2-(2'-allyloxy-5'-methylphenyl)-benztriazole used as starting material is obtained by the following process: 45 parts of 2-(2'-hydroxy-5'-methylphenyl)-benztriazole are refluxed for 8 hours with 14 parts of potassium carbonate, 5 parts of sodium iodide and 20 parts of allyl chloride in 200 parts by volume of acetone. The solvent is then distilled off under vacuum, the residue is dissolved in 200 parts by volume of benzene and the solution obtained is extracted twice with 50 parts by volume of a mixture of N sodium hydroxide solution and methanol 1:1. The solvent is then completely distilled off from the benzene solution in vacuo. In this way 46 parts of 2-(2'-allyloxy-5'-methylphenyl)-benztriazole are obtained as a yellow oil which is used in the crude state for the rearrangement.

If, instead of 2-(2'-hydroxy-5'-methylphenyl)-benztriazole 2-(2'-hydroxy-5'-methylphenyl)-5-chlorobenztriazole,
2-(2'-hydroxy-5'-methylphenyl)-5-carboxybenztriazole,
2-(2'-hydroxy-5'-methylphenyl)-5-ethylsulfonylbenztriazole,
2-(2'-hydroxy-4',5'-dimethylphenyl)-5-bromobenztriazole,
2-(2'-hydroxy-5'-methylphenyl)-benztriazole-5-carboxylic acid cyclohexylamide,
2-(2'-hydroxy-5'-methylphenyl)-benztriazole-5-carboxylic acid diethylamide,
2-(2'-hydroxy-5'-methylphenyl)-5-diethylamidosulfonylbentriazole, is used and otherwise the procedure given above is followed, then 2-(2'-allyloxy-5'-methylphenyl)-5-chlorobenztriazole,
2-(2'-allyloxy-5'-methylphenyl)-5-carboxybenztriazole,
2-(2'-allyloxy-5'-methylphenyl)-5-ethylsulfonylbenztriazole,
2-(2'-allyloxy-4',5'-dimethylphenyl)-5-bromo-benztriazole,
2-(2'-allyloxy-5'-methylphenyl)-benztriazole-5-carboxylic acid cyclohexylamide,
2-(2'-allyloxy-5'-methylphenyl)-benztriazole-5-carboxylic acid diethylamide,
2-(2'-allyloxy-5'-methylphenyl)-5-diethylamidosulfonylbenztriazole, is obtained.

*Example 2*

27.9 parts of 2-(2'-methallyloxy-5'-methylphenyl)-5-chlorobenztriazole are heated for 1½ hours at 190–200° with a 30 parts by volume of N,N-dimethylaniline. After cooling, the reaction mixture is poured into excess 2 N hydrochloric acid, the precipitate formed is filtered off under suction washed with water and recrystallised from ethanol. 2-(2'-hydroxy-3'-methallyl-5-methylphenyl)-5-chlorobenztriazole is obtained, M.P. 86°.

If instead of 2-(2'-methallyloxy-5'-methylphenyl)-5-chlorobenztriazole,
2-(2'-α-amylallyloxy-5'-methylphenyl)-benztriazole,
2-[2'(Δ$^{2''}$-octenyloxy)-5'-methylphenyl]-benztriazole,
2-(2''-γ-benzylallyloxy-5'-methylphenyl)-benztriazole,
2-[2'-(Δ$^{2''}$-pentenyloxy)-5'-methylphenyl]-benztriazole, or 2-(2'-α-ethylallyloxy-5'-methylphenyl)-benztriazole, is used and the same procedure is followed, then 2-(2'-hydroxy-3'-α-amylallyl-5'-methylphenyl)-benztriazole,
2-[2'-hydroxy-3'-(Δ$^{2''}$-octenyl)-5'-methylphenyl]-benztriazole,
2-(2'-hydroxy-3'-α-benzyallyl-5'-methylphenyl)-benztriazole,
2-(2'-hydroxy-3'-α-ethylallyl-5'-methylphenyl)-benztriazole,
2-(2'-hydroxy-3'-Δ$^{2''}$-pentenyl-5'-methylphenyl)-benztriazole, is obtained.

The 2-(2'-methallyloxy-5'-methylphenyl)-5-chloro-benztriazole used as starting material is produced in the following way: 260 parts of 2-(2'-hydroxy-5'-methylphenyl)-5-chloro-benztriazole are dissolved with 55 parts of sodium methylate in 400 parts by volume of methylethyl ketone. After the addition of 15 parts of sodium iodide, 100 parts of methallyl chloride are added dropwise within 8 hours to the boiling solution. The reaction mixture is stirred for another 2 hours at the boil and then the solvent is distilled off in vacuo. The residue is dissolved in 500 parts by volume of benzene and the solution obtained is extracted twice with 100 parts by volume of a mixture of 2 N sodium hydroxide solution and methanol 1:1. The benzene solution is concentrated in vacuo and the residue is stirred with 200 parts by volume of methanol while cooling with ice. The crystalline precipitate formed is filtered off under suction as cold as possible and washed with a little ice cold methanol. 200 to 230 parts of 2-(2'-methallyloxy-5'-methylphenyl)-5-chloro-benztriazole are obtained as a yellowish oil.

In an analogous manner, by reacting 2-(2'-hydroxy-5'-methylphenyl)-benztriazole instead of the 5-chloro derivative with corresponding amounts of 1-bromo-octene-(2), 3-bromo-octene-(1), γ-benzyl-allylbromide 1-bromopentene-(2), or 3-bromopentene-(1), 2-[2'-(Δ$^{2''}$-octenyloxy)-5'-methylphenyl]-benztriazole,
2-(2'-α-amylallyloxy-5'-methylphenyl)-benztriazole,
2-(2'-γ-benzylallyloxy-5'-methylphenyl)-benztriazole,
2-[2'-(Δ$^{2''}$-pentenyloxy)-5'-methylphenyl]-benztriazole,
2-(2'-α-ethylallyloxy-5'-methylphenyl)-benztriazole, is obtained.

*Example 3*

27.9 parts of 2-(2'-methallyloxy-5'-methylphenyl)-benztriazole are refluxed for 1 hour with 50 parts by volume of diethylene glycol monoethyl ether. After cooling 50 parts of potassium hydroxide are added to the solution and the whole is heated for 3 hours at 140–150°. After cooling, the reaction mixture is acidified with hydrochloric acid, the precipitate formed is filtered off under suction and crystallised from ligroin. 2-[2'-hydroxy-3'-(2''-methyl-Δ$^{1'''}$-propenyl) - 5'-methylphenyl]-benztriazole is obtained, M.P. 97°.

If instead of 2-(2'-methallyloxy-5'-methylphenyl)-benztriazole,
2-(2'-methallyloxy-5'-chlorphenyl)-4,6-dimethyl-benztriazole,
2-(2'-methallyloxy-5'-tert. butylphenyl)-benztriazole,
2-(2'-methyllyloxy-5'-cyclohexylphenyl)-benztriazole or
2-(2'-methyllyloxy-5'-phenylphenyl)-benztriazole is used with otherwise the same procedure, then 2-[2'-hydroxy-3'-(2''-methyl-Δ$^{1'''}$-propenyl)-5'-chlorphenyl]-4,6-dimethyl-benztriazole,
2-[2'-hydroxy-3'-(2''-methyl-Δ$^{1'''}$-propenyl)-5'-tert.-butylphenyl]-benztriazole,
2-[2'-hydroxy-3'-(2''-methyl-Δ$^{1'''}$-propenyl)-5'-cyclohexylphenyl]-benztriazole,
2-[2'-hydroxy-3'-(2''-methyl-Δ$^{1'''}$-propenyl)-5'-phenylphenyl]-benztriazole, is obtained.

The 2-(2'-methallyloxy-5'-methylphenyl)-benztriazole used as starting material is produced according to Example 2. In an analogous manner, on using corresponding amounts of 2-(2'-hydroxy-5'-chlorophenyl)-4,6-dimethyl-benztriazole,
2-(2'-hydroxy-5'-tert.-butylphenyl)-benztriazole,
2-(2'-hydroxy-5'-cyclohexylphenyl)-benztriazole, or
2-(2'-hydroxy-5'-phenylphenyl)-benztriazole, with methallylchloride, 2-(2'-methallyloxy-5'-chlorphenyl)-4,6-dimethyl-benztriazole,
2-(2'-methallyloxy-5'-tert.-butylphenyl)-benztriazole,
2-(2'-methallyloxy-5'-cyclohexylphenyl)-benztriazole, or
2-(2'-methallyloxy-5'-phenylphenyl)-benztriazole, is obtained.

Example 4

40 parts of the still moist o-nitroazo dyestuff, obtained by coupling 13.8 parts of diazotised o-nitroaniline with 17.6 parts of 2-α,α-dimethylallyl-4-methylphenol, in 100 parts by volume of methanol and 50 parts by volume of concentrated caustic soda lye are reduced with 22 parts of zinc dust. After acidifying with excess hydrochloric acid, the reaction product is filtered off under suction and crystallised from ethanol. 2-(2'-hydroxy-3'-α,α-dimethylallyl-5'-methylphenyl)-benztriazole is obtained. M.P. 116°.

On using the dyestuff produced from 2-nitro-4-methylaniline or from 2-nitro-4-methoxy-aniline or from 2-nitro-4-chloroaniline under otherwise the same procedure, 2-(2'-hydroxy - 3'-α,α - dimethylallyl - 5'-methylphenyl)-5-methyl-benztriazole, or 2-(2'-hydroxy-3'-α,α - dimethylallyl-5'-methylphenyl) - 5 - methoxy - benztriazole or 2-(2'-hydroxy-3'-α,α-dimethylallyl-5'-methylphenyl) - 5-chloro-benztriazole is obtained.

Example 5

21.6 parts of 2-(2'-p-toluene sulphonyloxy-3'-allyl-5'-methylphenyl)-benztriazole (obtained from equimolecular parts of 2-(2'-hydroxy-3' - allyl - 5' - methylphenyl)-benztriazole and p-toluene sulphonic acid chloride in alkaline medium), are heated for 3 hours at 140–145° in a solution of 50 parts of potassium hydroxide in 50 parts by volume of ethylene glycol monomethyl ether. After cooling, the reaction product is acidified with hydrochlotion and crystallised from ligroin. 2-[2' - hydroxy - 3'-ric acid, the precipitate formed is filtered off under suc-(Δ$^{1''}$ - propenyl) - 5' - methylphenyl] - benztriazole is obtained. M.P. 123°.

Example 6

34.1 parts of 2-(2'-cinnamyloxy - 5' - methylphenyl)-benztriazole in 50 parts by volume of N,N-dimethyl aniline are refluxed for 2 hours. After cooling, the reaction product is poured into water and acidified with hydrochloric acid. The precipitate formed is filtered off under suction, washed with water and crystallised from ligroin. 28 parts of 2-(2'-hydroxy-3'-α - phenylallyl - 5' - methylphenyl)-benztriazole are obtained. M.P. 103°.

If, instead of the 2-(2'-cinnamyloxy-5'-methylphenyl)-benztriazole, 2-(2'-cinnamyloxy - 5'-benzylphenyl)-benztriazole or 2-(2'-cinnamyloxy-5'-methylphenyl)-benztriazole-5-sulphonic acid butylamide 2-(2'-cinnamyloxy-5'-bromophenyl)-5-methylsulfonyl-benztriazole,
2-(2'-cinnamyloxy-5'-phenylphenyl)-5-butoxy-benztriazole,
2-(2'-cinnamyloxy-5'-tert.-butylphenyl)-benztriazole, or
2-(2'-cinnamyloxy-5'-butoxyphenyl)-4,6-dichloro-benztriazole is used and the same procedure is followed, then 2-(2'-hydroxy-3'-α-phenylallyl-5'-benzylphenyl)-benztriazole,
2-(2'-hydroxy-3'-α-phenylallyl-5'-methylphenyl)-benztriazole-5-sulfonic acid butylamide.
2-(2'-hydroxy-3'-α-phenylallyl-5'-bromophenyl)-5-methyl-sulfonyl-benztriazole,
2-(2'-hydroxy-3'-α-phenylallyl-5'-phenylphenyl)-5-butoxy-benzatriazole,
2-(2'-hydroxy-3'-α-phenylallyl-5'-tert.-butylphenyl)-benztriazole, or
2-(2'-hydroxy-3'-α-phenylallyl-5'-butoxyphenyl)-4,6-dichloro-benztriazole, is obtained.

The 2-(2'-cinnamyloxy-5'-methylphenyl) - benztriazole used as starting material is produced as follows:

45 parts of 2-(2'-hydroxy-5'-methylphenyl)-benztriazole, 40 parts of cinnamyl bromide and 14 parts of potassium carbonate are refluxed for 8 hours in 300 parts by volume of acetone. The product is worked up as described in the third paragraph of Example 1. 46 parts of 2-(2'-cinnamyloxy-5'-methylphenyl)-benztriazole are obtained. M.P. 86°.

Analogously, on reacting corresponding amounts of 2-(2'-hydroxy-5'-benzylphenyl)-benztriazole,
2-(2'-hydroxy-5'-methylphenyl)-benztriazole-5-sulfonic acid butylamide,
2-(2'-hydroxy-5'-bromophenyl)-5-methylsulfonyl-benztriazole,
2-(2'-hydroxy-5'-phenylphenyl)-5-butoxy-benztriazole,
2-(2'-hydroxy-5'-tert.-butylphenyl)-benztriazole, or
2-(2'-hydroxy-5'-butoxyphenyl)-4,6-dichloro-benztriazole, with cinnamylbromide 2-(2'-cinnamyloxy-5'-benzylphenyl)-benztriazole,
2-(2'-cinnamyloxy-5'-methylphenyl)-benztriazole-5-sulfonic acid butylamide,
2-(2'-cinnamyloxy-5'-bromophenyl)-5-methylsulfonyl-benztriazole,
2-(2'-cinnamyloxy-5'-phenylphenyl)-5-butoxy-benztriazole,
2-(2'-cinnamyloxy-5'-tert.-butylphenyl)-benztriazole,
2-(2'-cinnamyloxy-5'-butoxyphenyl)-4,6-dichloro-benztriazole, is obtained.

Example 7

17.7 parts of o-(allyloxy)-aniline, produced by Béchamp reduction of the reaction product of o-nitrophenol and allyl chloride in the presence of sodium iodide, are coupled with 13.7 parts of 3-methoxy-4-methylaniline in acetic acid solution and the azo dyestuff obtained, while still moist, is stirred with 500 parts by volume of pyridine. An ice cold solution of 17 parts of chlorine gas in 100 parts by volume of 2.5 N sodium hydroxide solution is slowly added at 10–30° and the mixture is stirred at about 30° until the dyestuff is decoloured. The pyridine is removed by stream distillation whereupon the 2-(2'-allyloxyphenyl)-5-methoxy-6-methyl-benztriazole is obtained first as an oil which then slowly crystallises in the cold.

If it is refluxed in five times the amount by weight of dimethyl aniline, while excluding air, for 30 minutes, then 2 - (2' - hydroxy - 3' - allylphenyl) - 5 - methoxy-6-methyl-benztriazole is obtained.

This substance is also obtained if the dyestuff described above is first refluxed in ten times its weight of dimethyl aniline and the 2-amino-2'-hydroxy-4-methoxy-5-methyl-3'-allyl-1,1'-azobenzene obtained is boiled in 500 parts by volume of pyridine with 200 parts by volume of 1 molar copper sulphate solution until the dyestuff is decoloured. The substance is isolated by adding 40 parts of sodium chloride to the pyridine phase, separating this and then removing the pyridine with steam.

Example 8

25.7 parts of 2 - nitro - 2' - hydroxy - 5' - methyl-1,1'-azobenzene (obtained by coupling 13.8 parts of diazotised o-nitraniline with 10.8 parts of 4-methylphenol), are refluxed for 8 hours with 7 parts of potassium carbonate, 5 parts of sodium iodide and 10 parts of allyl chloride in 150 parts by volume of acetone. The solvent is then distilled off in vacuo, the residue is dissolved in 200 parts by volume of benzene and the solution obtained is extracted twice with 50 parts by volume of a mixture of 2 N sodium hydroxide solution and methanol 1:1. The solvent is completely distilled off in vacuo from the benzene solution whereupon 2 - nitro - 2' - allyloxy - 5' - methyl - 1,1' - azobenzene is obtained. M.P. 67°.

29.7 parts of the 2-nitro-2'-allyloxy-5'-methyl-1,1'-azobenzene so obtained are dissolved in 300 parts by volume of ethanol, 30 parts of zinc dust and 50 parts by volume of concentrated sodium hydroxide solution are added to the solution and the whole is stirred at 40–45° until complete decolouration occurs. This solution is poured onto a mixture of 100 parts by volume of concentrated hydrochloric acid and 200 parts of ice and the oil which separates is extracted with benzene and the organic phase is separated. The benzene is distilled off from this organic phase and the residue is heated for 1 hour at 200–220° in an atmosphere of nitrogen. After cooling, the residue is recrystallised from methanol. 2 - (2' - hydroxy - 3' - allyl - 5' - methylphenyl)-benztriazole is obtained. M.P. 100°.

Example 9

30 parts of 2 - (2' - β - chloroallyloxy - 5' - methylphenyl)-benztriazole and 30 parts of N,N-dimethyl aniline are heated for 1½ hours at 190–200°. After cooling, the reaction mixture is poured into water and acidified with hydrochloric acid. The precipitate formed is filtered off under suction, washed with water and crystallised from methanol. 2-(2'-hydroxy-3'-β-chloroallyl-5'-methylphenyl)-benztriazole is obtained. M.P. 98°.

If instead of the 2-(2'-chloroallyloxy-5'-methylphenyl)-benztriazole,
2-(2'-β-chloroallyloxy-5'-methoxyphenyl)-benztriazole,
2-[2'-β-chloroallyloxy-5'-(α-phenylethyl)-phenyl]-benztriazole,
2-(2'-β-chloroallyloxy-5'-cyclopentylphenyl)-benztriazole,
2-(2'-β-chloroallyloxy-4',5'-dimethylphenyl)-5-carbobutoxy-benztriazole,
2-(2'-β-chloroallyloxy-5'-chlorophenyl)-5-carbomethoxy-benztriazole, or
2-(2'-β-chloroallyloxy-5'-methylphenyl)-benztriazole-5-sulphonic acid phenyl ester, is used and otherwise the same procedure is followed, then 2-(2'-hydroxy-3'-β-chloroallyl-5'-methoxyphenyl)-benztriazole,
2-[2'-hydroxy-3'-β-chloroallyl-5'-(α-phenylethyl)-phenyl]-benztriazole,
2-(2'-hydroxy-3'-β-chloroallyl-5'-cyclopentylphenyl)-benztriazole,
2-(2'-hydroxy-3'-β-chloroallyl-4',5'-dimethylphenyl)-5-carbobutoxy-benztriazole,
2-(2'-hydroxy-3'-β-chloroallyl-5'-chlorophenyl)-5-carbomethoxy-benztriazole, or
2-(2'-hydroxy-3'-β-chloroallyl-5'-methylphenyl)-benztriazole-5-sulphonic acid phenyl ester, is obtained.

The 2-(2'-β-chloroallyloxy-5'-methylphenyl) - benztriazole used as starting material is produced as follows:

112.5 parts of 2-(2'-hydroxy-5'-methylphenyl)-benztriazole in 300 parts by volume of acetone are refluxed for 8 hours with 27 parts of sodium methylate, 5 parts of sodium iodide and 60 parts of β-chloroallyl chloride. After cooling, 300 parts by volume of water and 300 parts by volume of benzene are added, the organic phase is separated and shaken out twice with 100 parts by volume of a mixture of 2 N sodium hydroxide solution and methanol 1:1. The benzene solution is dried for several hours over calcium chloride and then the solvent is distilled off in vacuo. The 2 - (2' - β-chloroallyloxy-5'-methylphenyl)-benztriazole remains as a yellow oil.

On reacting corresponding amounts of 2-(2'-hydroxy-5'-methoxyphenyl)-benztriazole,
2-[2'-hydroxy-5'-(α-phenylethyl)-phenyl]-benztriazole,
2-(2'-hydroxy-5'-cyclopentylphenyl)-benztriazole,
2-(2'-hydroxy-4',5'-dimethylphenyl)-5-carbobutoxy-benztriazole,
2-(2'-hydroxy-5'-chlorophenyl)-5-carbomethoxy-benztriazole, or
2-(2'-hydroxy-5'-methylphenyl)-benztriazole-5-sulphonic acid phenyl ester, with β-chloroallyl chloride in an analogous manner, then 2-(2'-β-chloroallyloxy-5'-methoxyphenyl)-benztriazole,
2-[2'-β-chloroallyloxy-5'-(α-phenylethyl)-phenyl]-benztriazole,
2-(2'-β-chloroallyloxy-5'-cyclopentylphenyl)-benztriazole,
2-(2'-β-chloroallyloxy-4',5'-dimethylphenyl)-5-carbobutoxy-benztriazole,
2-(2'-β-chloroallyloxy-5'-chlorophenyl)-5-carbomethoxy-benztriazole, or
2-(2'-β-chloroallyloxy-5'-methylphenyl)-benztriazole-5-sulphonic acid phenyl ester, is obtained.

Example 10

1000 parts of polypropylene granulate (Type 1014 of Avisun Corporation, Marcus Hook, Pa., U.S.A.) and 6 parts of 2-(2'-hydroxy-3'-α,α-dimethylallyl-5'-methylphenyl)-5-chloro-benztriazole according to Example 3 are mixed in a dry state and a film of 0.1 mm. thickness is made therefrom from a screw type extruder at 240°. The film absorbs ultraviolet light in the wave lengths of 300–365 mµ and, compared with a film made from the same polymer but without the addition of the stabliser, is more stable to cracking under the influence of sunlight by a factor of 6–8.

A very similar film is obtained if, instead of the compound used above, 2-(2'-γ-dimethylallyloxy-5'-methylphenyl)-5-chlorobenztriazole, is used.

Example 11

100 parts of marketed polyethylene terephthalate (Terlenka of Allgemeene Kunstzijde Unie, Arnhem, Holland), and 2 parts of 2-(2'-allyloxy-5'-methylphenyl)-benztriazole of Example 1 are mixed in a dry state and the mixture is extruded at 285° into a continuous film of about 0.2 mm. thickness. The transparent, substantially colourless films absorbs UV light of the wave lengths under 370 mµ and is suitable as packing material which can be heat-sealed for UV sensitive goods.

Example 12

100 parts of marketed polyamide chips (polycaprolactam of Emser Werke, A. G., Domat/Ems, Switzerland), and 1 part of 2-(2'-methallyloxy-5'-methylphenyl)-benztriazole according to Example 2 are mixed and the mixture is extruded through a ring dye at a temperature of 245–255° into a continuous film of about 0.08 mm. thickness. The transparent film absorbs UV light and, at a wave length of 365 mµ, it has a transmittance of less than 10%.

A similar film is obtained if, instead of the compound used above, 2-(2'-hydroxy-3'-methallyl-5'-methylphenyl)-benztriazole is used.

Polyhexamethylene adipate (nylon 66) can be worked up in the same way at 265–275° into UV dense films.

Example 13

100 parts of polyvinyl chloride powder (Hostalit C 270 of Farbwerke Hoechst A. G., formerly Meister Lucius & Brüning, Frankfurt am Main, Germany), 1 part of Thermolite 31, 0.5 part of Thermolite 17 (Metal & Thermit Corporation, Rahway, N.J., U.S.A.), 1 part of Wax E (Hoechst), and 1 part of 2-(2'-cinnamyloxy-5'-methylphenyl)-benztriazole according to Example 5 are worked up on a set of mixing rollers for 10 minutes at 180° and then drawn off as a sheet of 0.5 mm. thickness. The stiff, substantially colourless and transparent sheet absorbs substantially all UV light in the wave length under 380 mµ. The sheet can subsequently be moulded into articles which serve, e.g. for keeping UV sensitive goods.

The same result is obtained if, instead of the compound used above, 2-(2'-hydroxy-3'-α-phenylallyl-5'-methylphenyl)-benztriazole is used.

Similar results are obtained on using the compounds given below:

2-(2'-allyloxy-5'-methylphenyl)-5-ethylsulphonyl-benztriazole, 2-(2'-hydroxy-3'-2''-methyl-Δ$^{1'''}$-propenyl)-5'-cyclohexylphenyl)-benztriazole, 2-(2'-methyllyloxy-5'-chlorophenyl)-benztriazole, 2-(2'-hydroxy-3'-α,α-dimethylallyl-5'-methylphenyl)-5-chloro-benztriazole, or 2-(2'-cinnamyloxy-5'-methylphenyl)-benztriazole-5-sulphonic acid butylamide.

Example 14

100 parts of methacrylate resin (Resarit 844 Z of Resart Gesellschaft Kalkhof & Rose, Chem. Fabrik, Mainz (Rhine, Germany), and 0.2 part of 2-(2'-allyloxy-5'-methylphenyl)-benztriazole according to Example 1 are mixed in a dry state and injection moulded at a temperature of 195–205° into watch glasses of 2 mm. thickness.

The watch glasses absorb substantially all UV light and are suitable particularly for covering coloured dials.

Example 15

A polyvinyl butyrate sheet (produced by acetalisation of polyvinyl alcohol with butyraldehyde) is immersed for 3 minutes in a solution of 8 parts of a 3:1 mixture of 2-(2'-hydroxy-3'-α-pentyl-allyl-5'-methylphenyl)-benztriazole and 2-[2'-hydroxy-3'-(Δ$^{2''}$-octenyl)-5'-methylphenyl]-benztriazole in 100 parts by volume of benzene and well dried in the air. Two glass plates are bonded with the sheet so obtained at 140° and 7 atm./sq. cm. The safety glass so obtained is UV dense and in addition the organic binder is less prone to yellowing than that of an analogous safety glass plate made with an untreated binder.

What is claimed is:
1. A compound of the formula

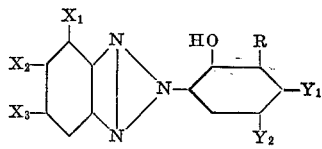

wherein R is a member selected from the group consisting of

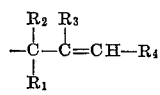

and

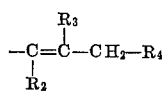

in which $R_1$ is a member selected from the group consisting of hydrogen and lower alkyl, $R_2$ is a member selected from the group consisting of hydrogen, lower alkyl, benzyl and phenyl, $R_3$ is a member selected from the group consisting of hydrogen, lower alkyl and halogen, and $R_4$ is a member selected from the group consisting of hydrogen and lower alkyl, and wherein each of $X_1$, $X_2$ and $X_3$, taken independently of the other, is a member selected from the group consisting of hydrogen, halogen, lower alkyl, lower alkoxy, carboxyl, lower alkoxycarbonyl, mono- and di-lower alkylamidocarbonyl and -sulfonyl, lower alkylsulfonyl, phenyloxy- and cresyloxy-sulfonyl, cyclohexylamido-sulfonyl and -carbonyl, benzylamido-carbonyl and -sulfonyl, phenylamidocarbonyl and -sulfonyl, morpholino-carbonyl and -sulfonyl, and piperidino-carbonyl and -sulfonyl and each of $Y_1$ and $Y_2$ represents a member selected from the group consisting of hydrogen, lower alkyl, lower alkoxy, cycloalkyl with from 5 to 6 carbon atoms, mononuclear aralkyl with from 7 to 8 carbon atoms, phenyl, chlorine, and bromine.

2. A compound of the formula

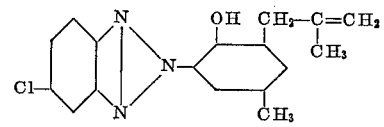

3. A compound of the formula

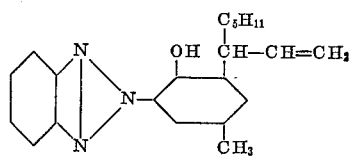

4. A compound of the formula

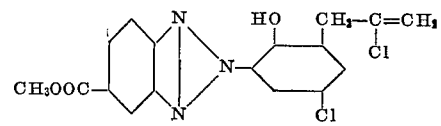

5. A compound of the formula

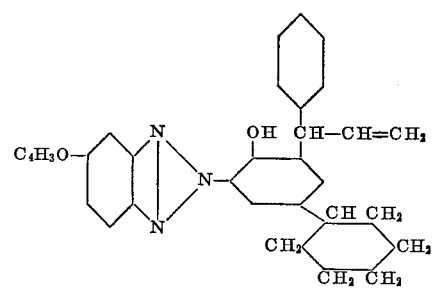

6. A compound of the formula

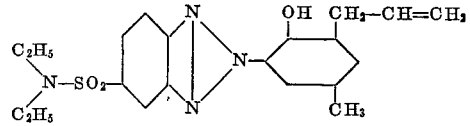

References Cited by the Examiner
UNITED STATES PATENTS

| | | | |
|---|---|---|---|
| 3,072,585 | 1/1963 | Milionis et al. | 260—308 |
| 3,074,910 | 1/1963 | Dickson | 260—308 |
| 3,076,782 | 2/1963 | Mohr et al. | 260—308 |

NICHOLAS S. RIZZO, *Primary Examiner.*

DUVAL T. McCUTCHEN, *Examiner.*